(12) United States Patent
Farjon

(10) Patent No.: US 10,274,956 B2
(45) Date of Patent: Apr. 30, 2019

(54) METHOD FOR GUIDING AN AIRCRAFT

(71) Applicant: Safran Electronics & Defense, Boulogne Billancourt (FR)

(72) Inventor: Julien Farjon, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 52 days.

(21) Appl. No.: 15/304,833

(22) PCT Filed: Apr. 22, 2015

(86) PCT No.: PCT/EP2015/058653
§ 371 (c)(1),
(2) Date: Oct. 17, 2016

(87) PCT Pub. No.: WO2015/162151
PCT Pub. Date: Oct. 29, 2015

(65) Prior Publication Data
US 2017/0185083 A1 Jun. 29, 2017

(30) Foreign Application Priority Data
Apr. 22, 2014 (FR) ..................................... 14 53591

(51) Int. Cl.
*G05D 1/00* (2006.01)
*G08G 5/02* (2006.01)
(Continued)

(52) U.S. Cl.
CPC ............ *G05D 1/0083* (2013.01); *G01C 23/00* (2013.01); *G06K 9/00637* (2013.01); *G08G 5/025* (2013.01); *G08G 5/065* (2013.01)

(58) Field of Classification Search
None
See application file for complete search history.

(56) References Cited

U.S. PATENT DOCUMENTS 9,640,081 B2 * 5/2017 Gannon ................. G08G 5/025
2004/0026573 A1 2/2004 Andersson et al.
(Continued)

FOREIGN PATENT DOCUMENTS

| EP | 1335258 A1 | 8/2003 |
| EP | 2557552 A1 | 2/2013 |
| EP | 2610590 A2 | 7/2013 |

OTHER PUBLICATIONS

International Search Report with English Language Translation, dated May 18, 2015, PCT Application No. PCT/EP2015/058653.
(Continued)

*Primary Examiner* — Abby Y Lin
*Assistant Examiner* — Kyung J Kim
(74) *Attorney, Agent, or Firm* — Womble Bond Dickinson (US) LLP

(57) ABSTRACT

The invention relates to a method for guiding an aircraft along a reference path, said method comprising: a) when the altitude of the aircraft is greater than a threshold, estimating (E1) a relative location of the aircraft in relation to a taxiing starting point using a map of the platform and reference points on the ground, b) when the altitude of the aircraft is less than said threshold and before the aircraft is located at the taxiing starting point, estimating (E2) a relative location of the aircraft in relation to the taxiing starting point using data relating to the absolute location of the aircraft and the last relative location estimated at step a), c) when the aircraft is located at the taxiing starting point, guiding (E3) the aircraft on the basis of a location of the aircraft relative to the reference path as estimated using data relating to a set of indicators on the ground.

9 Claims, 3 Drawing Sheets

(51) Int. Cl.
*G08G 5/06* (2006.01)
*G06K 9/00* (2006.01)
*G01C 23/00* (2006.01)

(56) References Cited

U.S. PATENT DOCUMENTS

2006/0167598 A1\* 7/2006 Pennarola ............ G08G 5/0013
 701/11
2012/0176497 A1 7/2012 Shadmi

OTHER PUBLICATIONS

French Search Report with English Language Translation Cover Sheet, dated Nov. 12, 2014, French Application No. 1453591.

\* cited by examiner

METHOD FOR GUIDING AN AIRCRAFT

GENERAL TECHNICAL FIELD

The invention relates to the field of assistance for piloting in a ground-displacement phase of an aircraft and more specifically to a guiding method comprising the resetting in flight of the position of the aircraft with respect to reference points.

STATE OF THE ART

During taxiing phases on the ground of an aircraft, the pilot of the aircraft should lead the latter between the runways and the airport infrastructures safely in spite of reduced visibility.

In order to assist the pilot in his/her task, there exist guiding systems responsible for automatically leading the aircraft along a reference trajectory from a taxiing initial point. Such systems determine the relative position of the aircraft with respect to the reference trajectory to be followed. The deviation between the actual trajectory of the aircraft and the trajectory to be followed may then be used in a self-contained guiding method for correcting the trajectory of the craft. Such methods generally determine the position of the aircraft with respect to the reference trajectory, like the central line of a runway, by means of indicators on the ground, such as reflective markings, pads or lamps.

Nevertheless, in order that such a method operates correctly, it must be ensured that the aircraft is actually at the beginning point of the taxiing defined as the point of origin of the reference trajectory when the guiding method begins guiding the aircraft. If the latter is found by error at another point of the platform, the trajectory followed by the guiding method will not be the expected reference trajectory and the aircraft risks being guided in a wrong direction and placed in a hazardous situation. As an example, taxiing may begin by leaving the runway track through an exit ramp and each track may include several exit ramps. It should then be ensured that the aircraft takes the exit ramp through which passes the reference trajectory.

Now, the guiding method on the ground does not have means allowing it to make sure at the beginning of the guiding of the exact position of the aircraft on the platform. The absolute positioning means such as GPS cannot be sufficiently accurate. Also, the detection of the exact position of the aircraft from the indicators is difficult because of the complexity of the scene as visible from a ground position.

Therefore there exists a need of a guiding method including steps giving the possibility of making sure of the exact position of the aircraft with respect to the taxiing initial point before application of the strictly speaking guiding steps.

PRESENTATION OF THE INVENTION

The present invention thus relates according to a first aspect to a method for guiding along a reference trajectory an aircraft having on board at least one detector of a plurality of indicators on the ground,
said guiding method comprising the following steps applied by a data processing module which may be connected to said at least one detector:
a) when the altitude of the aircraft in flight is greater than a threshold, estimating a relative localization of the aircraft with respect to a taxiing initial point from a mapping of the platform and of markers on the ground,
b) when the altitude of the aircraft is less than said threshold and before the aircraft is localized at the taxiing initial point, estimating a relative localization of the aircraft with respect to the taxiing initial point from absolute localization data of the aircraft and from the last relative localization of the aircraft with respect to the taxiing initial point estimated in step a),
c) when the aircraft is localized at the taxiing initial point, guiding the aircraft according to a localization of the aircraft relative to the reference trajectory estimated from data relative to a set of indicators on the ground and transmitted by said at least one detector.

Such a method gives the possibility of accurately localizing at any moment the aircraft with respect to the taxiing initial point of the reference trajectory and of triggering the guiding of the craft when the aircraft is actually at the taxiing initial point, a point of origin of the reference trajectory which will thus be followed by the aircraft.

For this purpose, the processing module may receive images transmitted by image capture means loaded on board the aircraft and detect the markers on the ground from said received images.

This gives the possibility of detecting the markers on the ground from their position in an image and of inferring therefrom the position of the aircraft with respect to the taxiing initial point.

The processing module may also receive absolute localization data transmitted by a GPS receiver and an inertial navigation system loaded on board the aircraft.

The absolute position data give the possibility of continuing to localize the aircraft with respect to the taxiing initial point from the last localization estimated in step a) in spite of the impossibility of positioning the aircraft with respect to the markers on the ground.

The threshold may be determined according to weather conditions.

This gives the possibility of making sure that the data relating to the markers on the ground obtained by the processing module are acquired at a sufficient altitude so that they may be utilized.

According to a second aspect, the invention relates to a computer program product comprising code instructions for executing a guiding method according to the first aspect, when this program is executed by a processor.

According to a third aspect, the invention relates to a data processing module which may be connected to at least one detector of a plurality of indicators localized on a platform on the ground, said at least one detector being loaded on board an aircraft and said processing module being configured for:
a) when the altitude of the aircraft in flight is greater than a threshold, estimating a relative localization of the aircraft with respect to a taxiing initial point from a mapping of the platform and of markers on the ground,
b) when the altitude of the aircraft is less than said threshold and before the aircraft is localized at the taxiing initial point, estimating a relative localization of the aircraft with respect to the taxiing initial point from absolute localization data of the aircraft and from the last relative localization of the aircraft with respect to the taxiing initial point estimated in step a),
c) when the aircraft is localized at the taxiing initial point, guiding the aircraft according to a localization of the aircraft relative to the reference trajectory estimated from data relative to a set of indicators on the ground and transmitted by said at least one detector.

According to a fourth aspect, the invention relates to a system for guiding an aircraft along a reference trajectory on a platform on the ground comprising: at least one detector, a plurality of indicators on the ground, means for detecting markers on the ground, a data processing module according to the third aspect.

The system for guiding an aircraft according to the fourth aspect may further comprise image capture means.

The system for guiding an aircraft according to the fourth aspect may further also comprise a GPS receiver and an inertial navigation system.

Such computer program products, processing module and guiding system have the same advantages as those mentioned for the method according to the first aspect.

PRESENTATION OF THE FIGURES

Other features and advantages of the present invention will become apparent upon reading the description which follows of an embodiment of the invention. This description will be given with reference to the appended drawings wherein.

DETAILED DESCRIPTION

Figure 1:
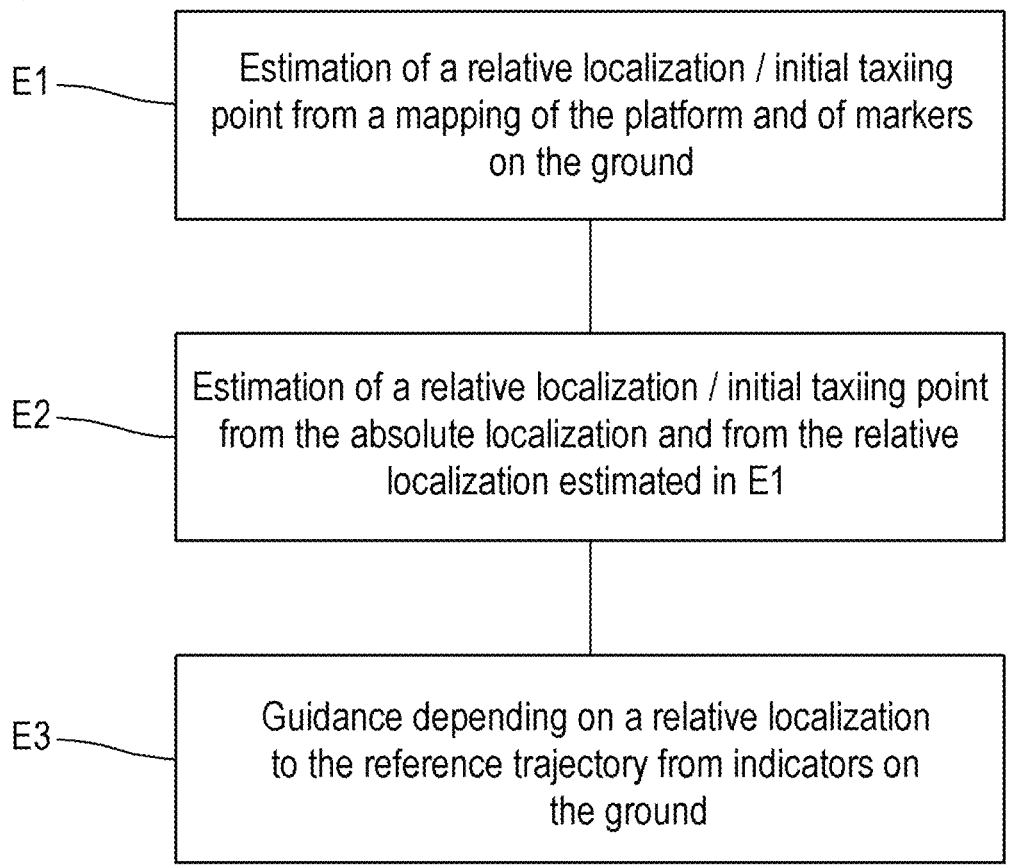
FIG. 1 is a diagram schematizing an application of a method for guiding an aircraft according to the invention
Figure 2:
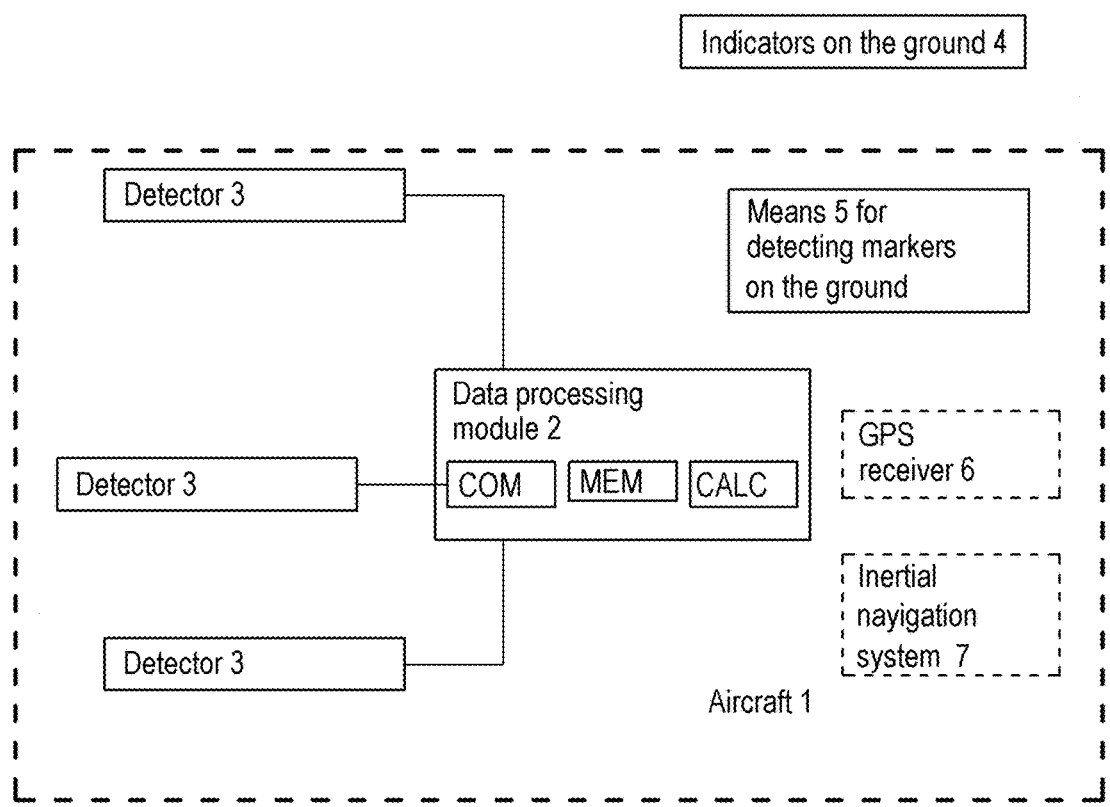
FIG. 2 illustrates a system for guiding an aircraft according to an embodiment of the invention.

With reference to FIG. 1, an embodiment of the invention relates to a method for guiding an aircraft 1 on a platform along a reference trajectory applied by a data processing module 2 of a system for guiding an aircraft illustrated in FIG. 2.

Such a system comprises indicators on the ground 4 used for marking the taxiing areas of the platform and at least one detector 3 loaded on board the aircraft 1 and adapted for detecting the position of such indicators on the ground. Such a detector 3 senses the signals sent or reflected by said indicators on the ground 4. Such a detector may for example be an optical or optoelectronic sensor sensing light emitted by light sources such as lamps or reflected by reflective markings. Such a detector 3 may also be a radiofrequency receiver receiving radio signals emitted by antennas positioned on the ground.

Said detectors 3 may be connected to the processing module so as to provide it with measurement data allowing the processing module 2 to determine the relative localization of the aircraft with respect to these indicators.

The data processing module 2 may include communication means such as a communication interface COM, computing means such as a computer CALC and storage means MEM. Such a computer may consist in a processor or microprocessor, of the x-86 or RISC type for example, a controller or micro-controller, a DSP, an integrated circuit such as an ASIC or programmable circuit such as an FPGA, a combination of such elements or any other combination of components giving the possibility of applying the computing steps of the method described below. The MEM storage means may consist in any type of computer bulk storage such as a magnetic hard disc with a plate, an SSD disc, flash memory or further a CD-ROM or DVD-ROM reader.

Said communication means COM may be used for communicating with the detectors 3. The MEM storage means may notably be used for storing one or several mapping representations of the airport platform on which the aircraft 1 has to be guided.

Figure 3:
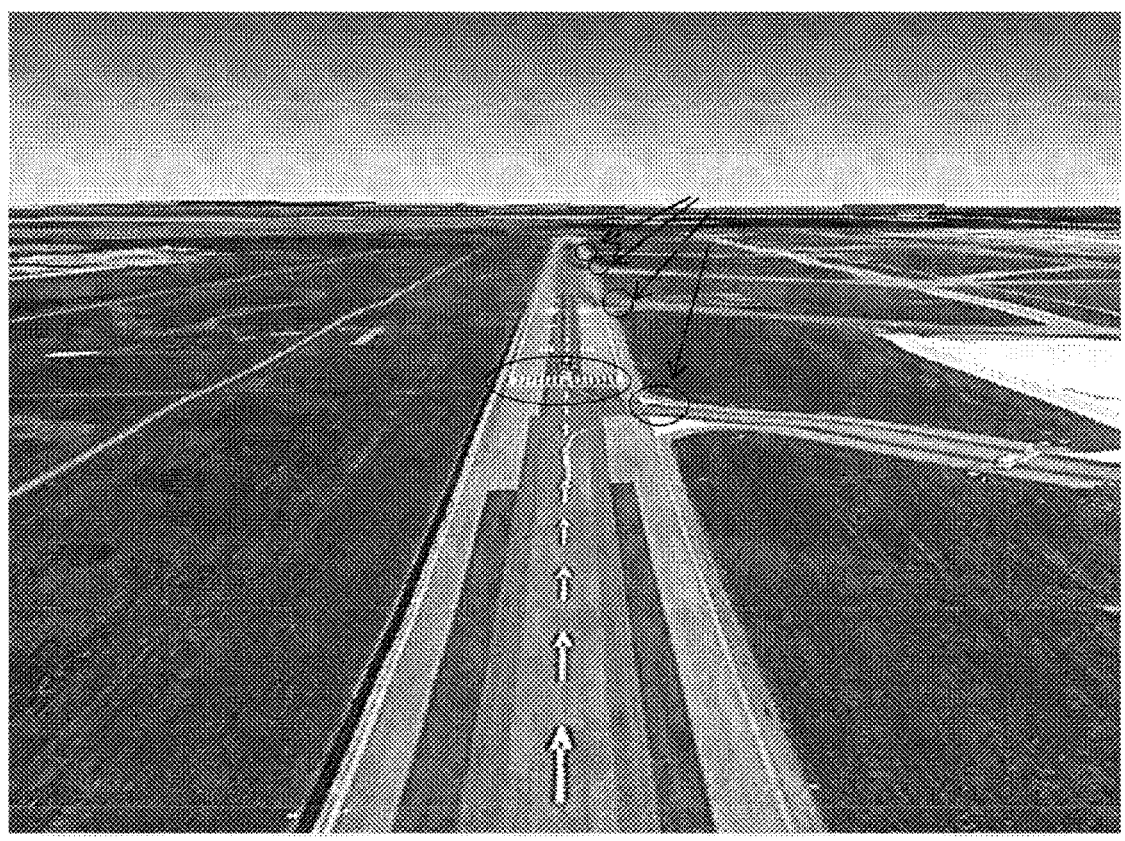
FIG. 3 illustrate examples of markers on the ground.

Said system also includes means 5 for detecting markers on the ground which may be used for accurately localizing the aircraft with respect to a detailed mapping representation of the platform stored in the MEM storage means. Such markers may be markings such as runway threshold markings and end-off-runway threshold markings, connection points of entry and exit ramps of a runway etc . . . as shown in FIG. 3. Such detection means 5 may be optical or optoelectronic means, image capture means such as a camera or a video camera, radiofrequency receivers . . . . Such means for detecting markers are loaded on board the aircraft 1 and may coincide with the detectors 3 used for detecting the indicators on the ground.

The data processing module 2 may be connected to at least one computer of the aircraft or be integrated therein, so as to be able to transmit to it commands for guiding the aircraft.

The guiding system may also comprise a GPS receiver 6 and an inertial navigation system 7.

The method according to the invention proposes the determination during landing, of the position of the aircraft with respect to markers on the ground in order to localize the aircraft with respect to the taxiing initial point. This gives the possibility of only applying the autonomous guiding of the aircraft from indicators on the ground only when the aircraft has actually reached the taxiing initial point.

For this, the method detects the markers on the ground during the landing phase of the aircraft, for example from a photograph of the platform taken in flight, and determines the position of the aircraft with respect to the taxiing initial point by means of a mapping of the platform on which the position of the marker points is geo-referenced.

More specifically, with reference to FIG. 1, during a first estimation step E1, the processing module estimates a relative localization of the aircraft with respect to a taxiing initial point from mapping of the platform and of the markers on the ground. This estimation is carried out in flight when the aircraft is at an altitude greater than a sufficient threshold so that the markers may be properly detected. For example, if the means 5 for detecting markers on the ground are image capture means, this estimation is achieved by the processing module from images transmitted by image capture means when the aircraft is at a sufficient altitude for having an overview of the platform and for differentiating without any ambiguity the different markers on the ground. The altitude threshold may be variable and determined for example depending on the weather conditions. This estimation may be applied once at an altitude greater than the threshold or else repeated as long as the aircraft is found at an altitude above the threshold.

During a second estimation step E2, the processing module estimates a relative localization of the aircraft with respect to the taxiing initial point from absolute localization data of the aircraft and from last relative localization of the aircraft with respect to the taxiing initial point obtained during the first estimation step E1. This second estimation step is applied when the altitude of the aircraft is less than the threshold and before the aircraft is localized at the taxiing initial point. Since the aircraft is at a too low altitude and that the markers on the ground may no longer be utilized for localizing the aircraft, the processing module thus continues to localize the aircraft with respect to the taxiing initial point from the last localization obtained from the markers on the ground and from the absolute position data which may be obtained by a GPS receiver or an inertial navigation system. This estimation may be repeatedly applied as long as the aircraft has not reached the taxiing initial point.

The estimation of the localization of the aircraft obtained repeatedly during the second estimation step E2 allows the processing module to follow the approach of the aircraft towards the taxiing initial point. When the aircraft seems to have reached the taxiing point, the processing module applies a guiding step E3 during which the aircraft is guided along the reference trajectory according to a localization relative to the reference trajectory estimated from data relative to a set of indicators on the ground and transmitted by said at least one detector. The fact that this guiding step is actually applied from the taxiing initial point gives the possibility of making sure that the proper indicators on the ground are taken into account for proceeding with the guiding of the craft and that the latter will actually be guided along the desired reference trajectory. During this step, the taking into account of the localization of the aircraft with respect to the reference trajectory, determined from indicators on the ground, gives the possibility of correcting the trajectory of the aircraft so as to make it permanently follow the reference trajectory.

Thus, the detection during the landing phase of the position of the aircraft with respect to the taxiing initial point gives the possibility of then localizing the aircraft at any moment as far as the taxiing initial point where is applied the autonomous guiding of the aircraft from markers on the ground.

The invention claimed is:

1. A method for guiding along a reference trajectory on an airport platform an aircraft having on board at least one detector of a plurality of indicators on the ground used for marking the taxiing areas of the platform, said guiding method comprising the following steps applied by a data processing module connected to said at least one detector:

a) when the altitude of the aircraft in flight is greater than a threshold, estimation of a relative localization of the aircraft with respect to a taxiing initial point from a mapping of the airport platform and of markers on the ground, b) when the altitude of the aircraft is less than said threshold and before the aircraft is localized at the taxiing initial point, estimation of a relative localization of the aircraft with respect to the taxiing initial point from absolute localization data of the aircraft and from the last relative localization of the aircraft with respect to the taxiing initial point estimated in step a), c) when the aircraft is localized at the taxiing initial point, autonomous guidance of the aircraft according to a localization of the aircraft relative to the reference trajectory estimated from data relative to a set of indicators on the ground used for marking the taxiing areas of the airport platform and transmitted by said at least one detector.

2. The method according to claim 1, wherein the processing module receives images transmitted by image capture means loaded on board the aircraft and detects the markers on the ground from said received images.

3. The method according to claim 1, wherein the processing module receives absolute localization data transmitted by a GPS receiver and an inertial navigation system loaded on board the aircraft.

4. The method according to claim 1, wherein the threshold is determined according to weather conditions.

5. A non-transitory computer readable medium storing a code instructions comprising code instructions for executing a guiding method according to claim 1, when this program is executed by a processor.

6. A data processing module connected to said at least one detector of a plurality of indicators localized on an airport platform on the ground and used for marking the taxiing areas of the platform, said at least one detector being loaded on board an aircraft and said processing module being configured for:

a) when the altitude of the aircraft in flight is greater than a threshold, estimating a relative localization of the aircraft with respect to a taxiing initial point from a mapping of the airport platform and of markers on the ground, b) when the altitude of the aircraft is less than said threshold and before the aircraft is localized at the taxiing initial point, estimating a relative localization of the aircraft with respect to the taxiing initial point from absolute localization data of the aircraft and from the last relative localization of the aircraft with respect to the taxiing initial point estimated in step a), c) when the aircraft is localized at the taxiing initial point, guiding the aircraft on the platform in an autonomous manner according to a localization of the aircraft relative to the reference trajectory estimated from data relative to a set of indicators on the ground used for marking the taxiing areas of the airport platform and transmitted by said at least one detector.

7. A system for guiding an aircraft along a reference trajectory on a platform on the ground comprising: at least one detector, a plurality of indicators on the ground, means for detecting markers on the ground, a data processing module according to claim 6.

8. The system for guiding an aircraft according to claim 7 further comprising image capture means.

9. The system for guiding an aircraft according to claim 7 further comprising a GPS receiver and an inertial navigation system.

* * * * *